United States Patent [19]

Gileta

[11] Patent Number: 5,240,169
[45] Date of Patent: Aug. 31, 1993

[54] GAS SHROUDED WAVE SOLDERING WITH GAS KNIFE

[75] Inventor: John H. Gileta, Chateauguay, Canada

[73] Assignee: Electrovert Ltd., LaPrairie, Canada

[21] Appl. No.: 961,781

[22] Filed: Oct. 15, 1992

Related U.S. Application Data

[63] Continuation-in-part of Ser. No. 860,316, Mar. 30, 1992, Pat. No. 5,023,489, which is a continuation-in-part of Ser. No. 804,904, Dec. 6, 1991, abandoned.

[51] Int. Cl.$^5$ .......................... B23K 1/00; B23K 3/08
[52] U.S. Cl. ................................. 228/180.1; 228/219; 228/37; 228/42
[58] Field of Search ..................... 228/180.1, 219, 232, 228/260, 262, 37, 42, 56.1

[56] References Cited

U.S. PATENT DOCUMENTS

| | | |
|---|---|---|
| 3,216,643 | 7/1962 | De Verter . |
| 3,704,686 | 12/1972 | Schrempp et al. . |
| 3,705,457 | 12/1972 | Tardoskegyi . |
| 4,412,641 | 11/1983 | Fuchs et al. . |
| 4,568,012 | 2/1986 | Kakuhata et al. . |
| 5,044,542 | 9/1991 | Deambrosio . |
| 5,048,746 | 9/1991 | Elliott et al. . |

FOREIGN PATENT DOCUMENTS

| | | |
|---|---|---|
| 286058 | 12/1986 | Japan . |
| 1486281 | 3/1987 | U.S.S.R. . |

Primary Examiner—Samuel M. Heinrich
Attorney, Agent, or Firm—Darby & Darby

[57] ABSTRACT

A cover plate or shroud extends over a solder reservoir and has a slot for a solder wave to extend up above the cover plate. A reduced oxygen atmosphere is supplied from gas outlets under the cover plate on both sides of the solder wave. Furthermore a gas knife is located to direct a stream of gas on an element such as a circuit board as it passes through the solder wave. The cover plate or shroud provides reduced oxides on the solder surfaces and the gas knife removes excess solder on elements that have been solder coated. The apparatus has a solder reservoir for holding solder with a solder nozzle projecting therefrom and a pump for forming a solder wave from the nozzle. Two solder waves may be provided each with their own cover plate and gas supplied on each side of each wave below the cover plate.

57 Claims, 7 Drawing Sheets

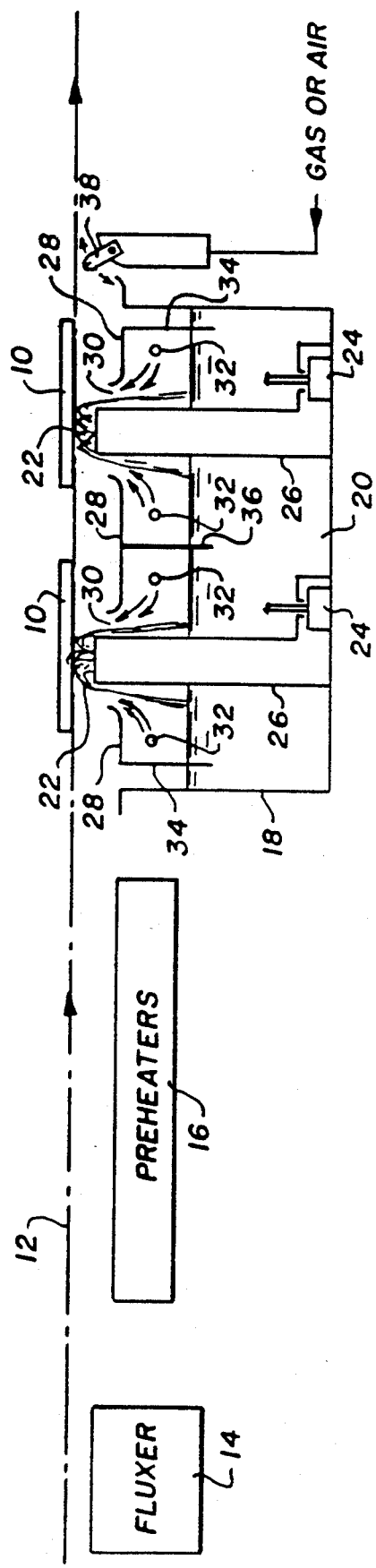

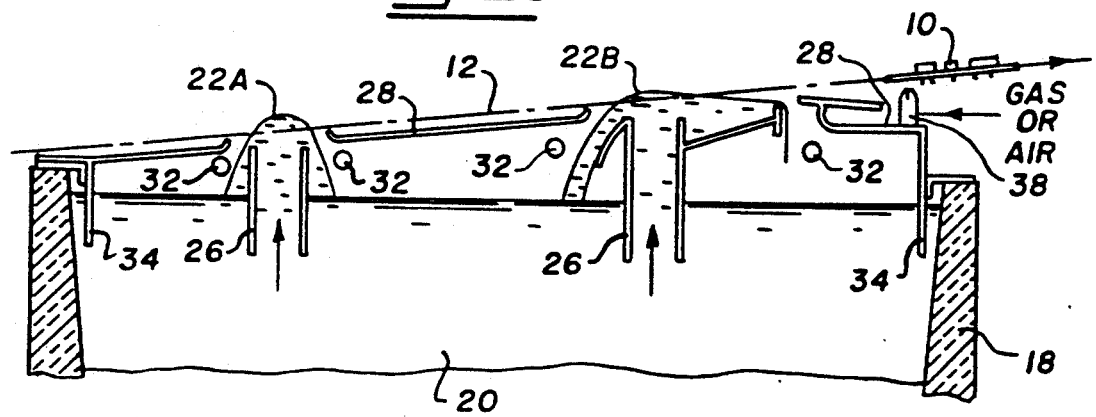
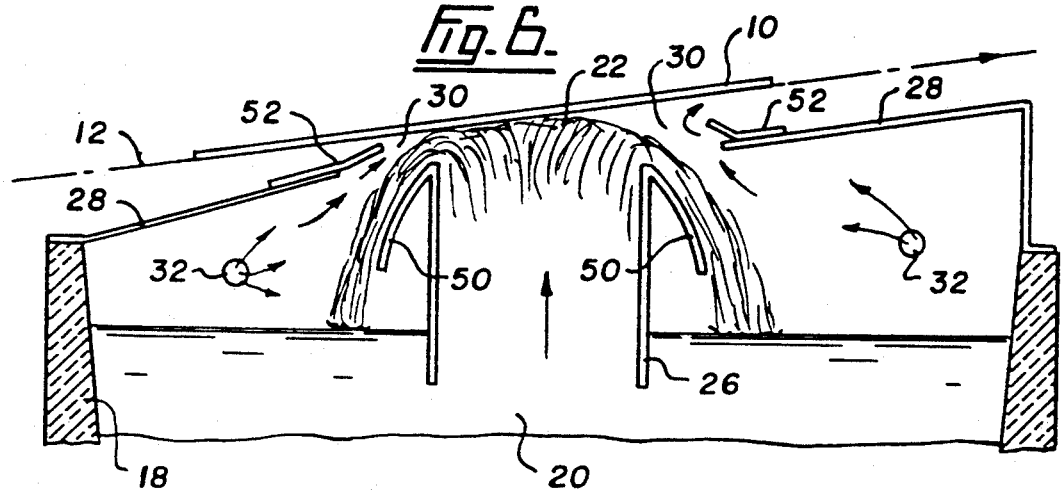
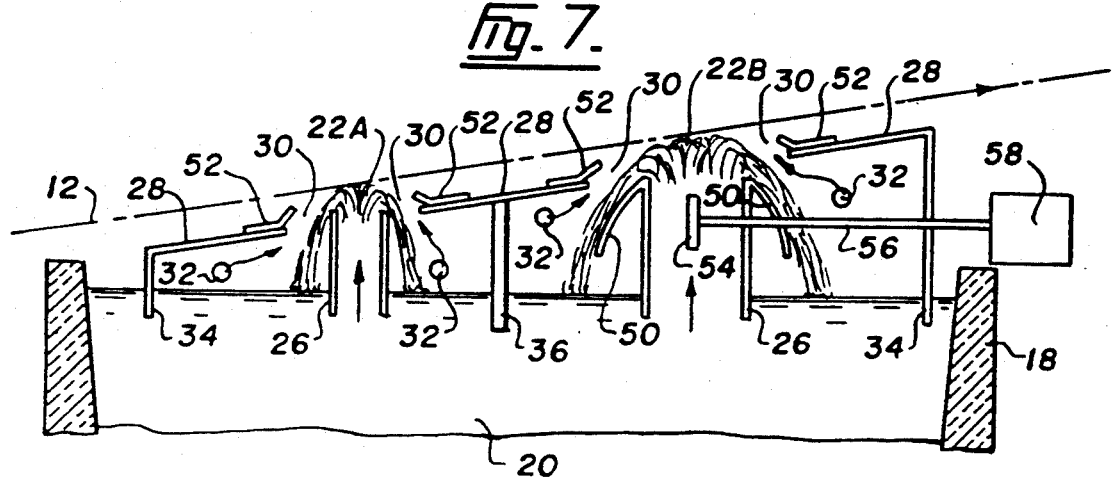

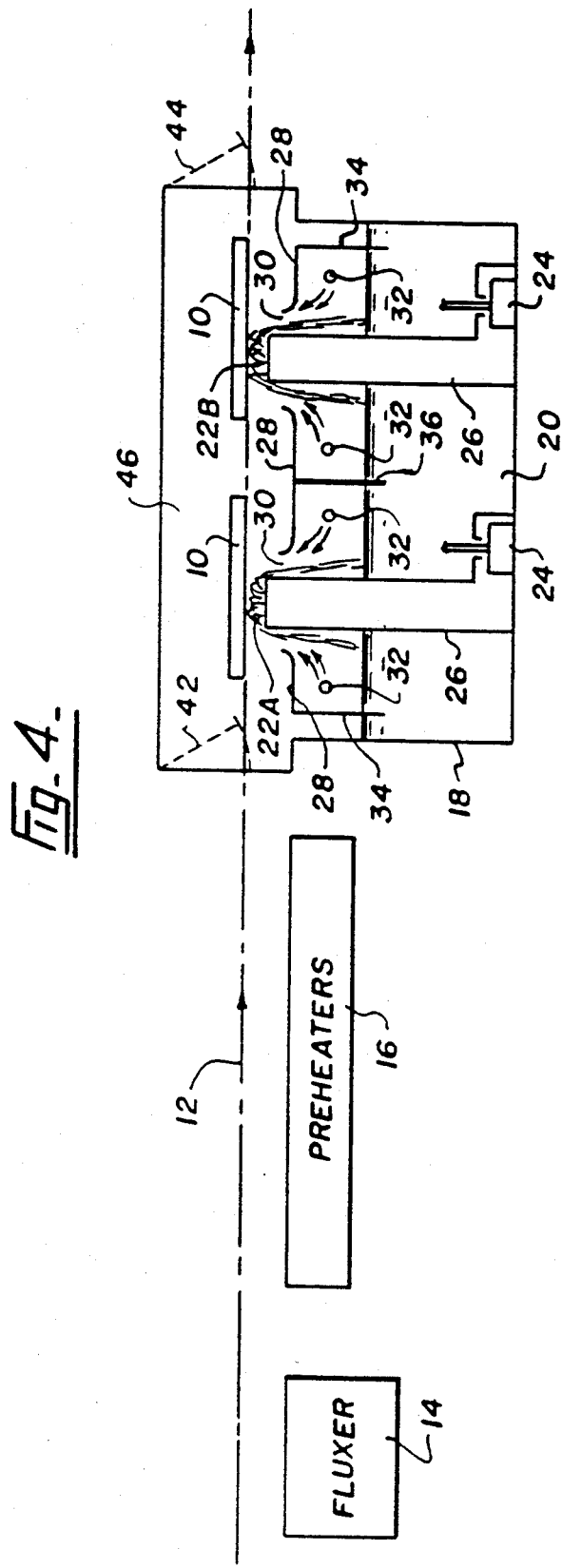

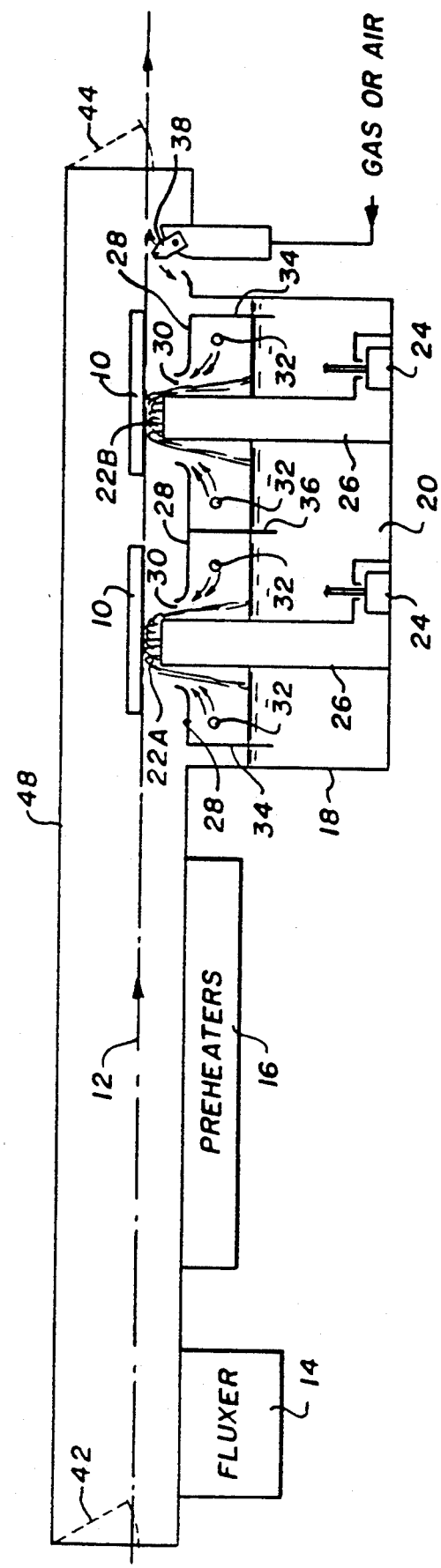

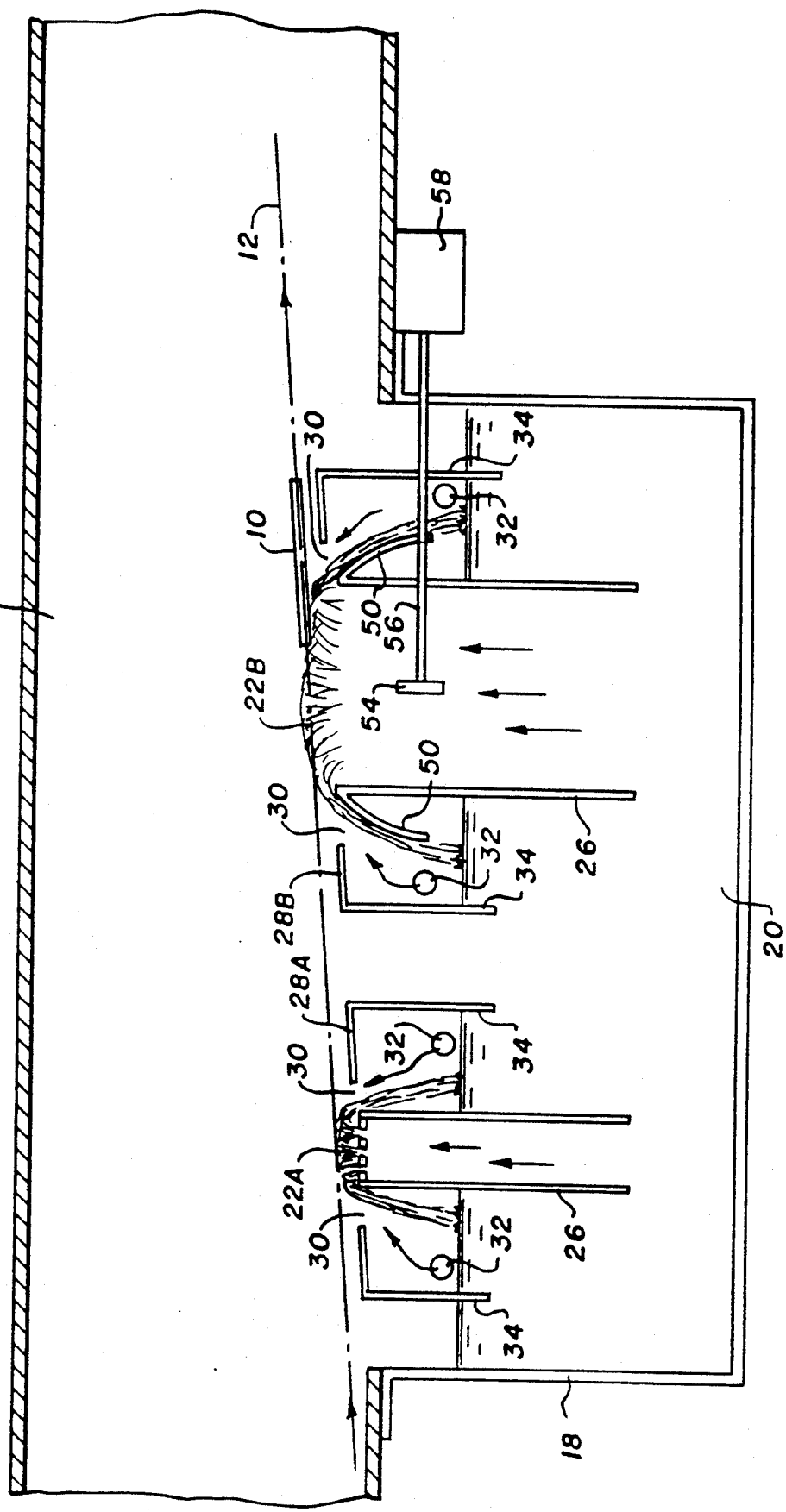

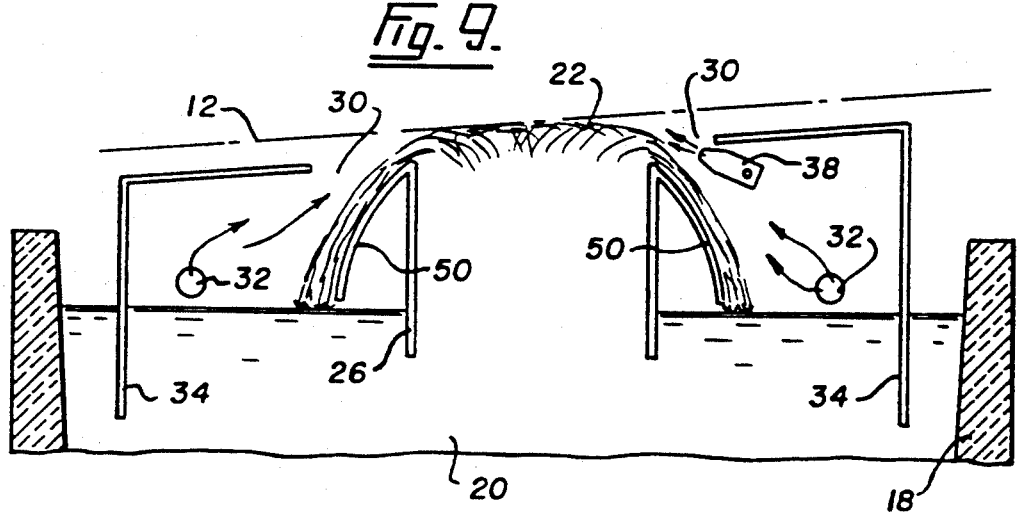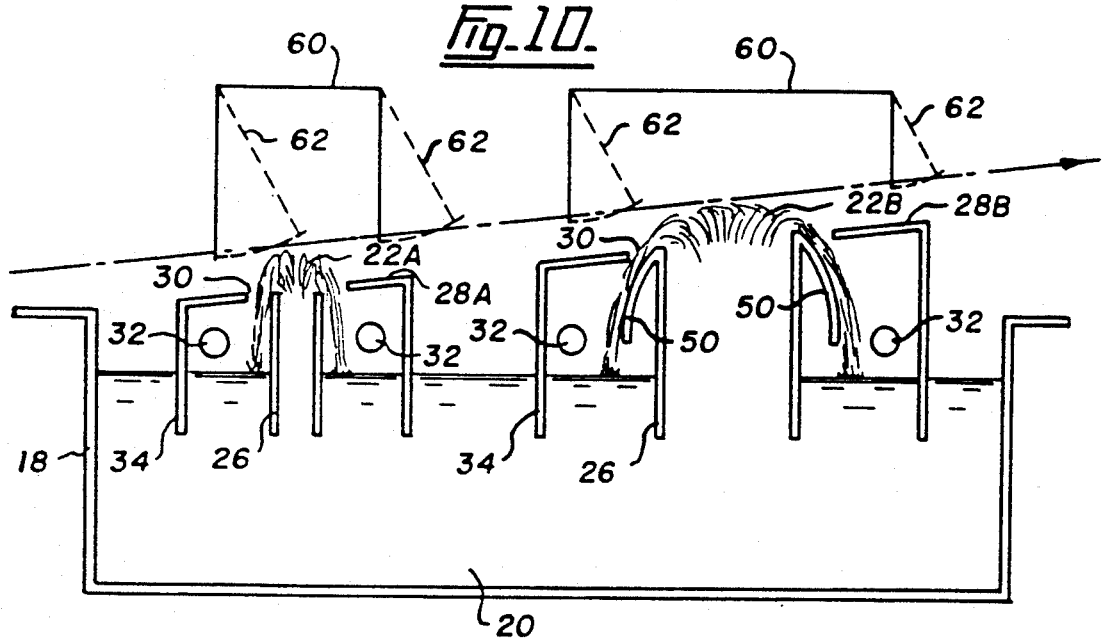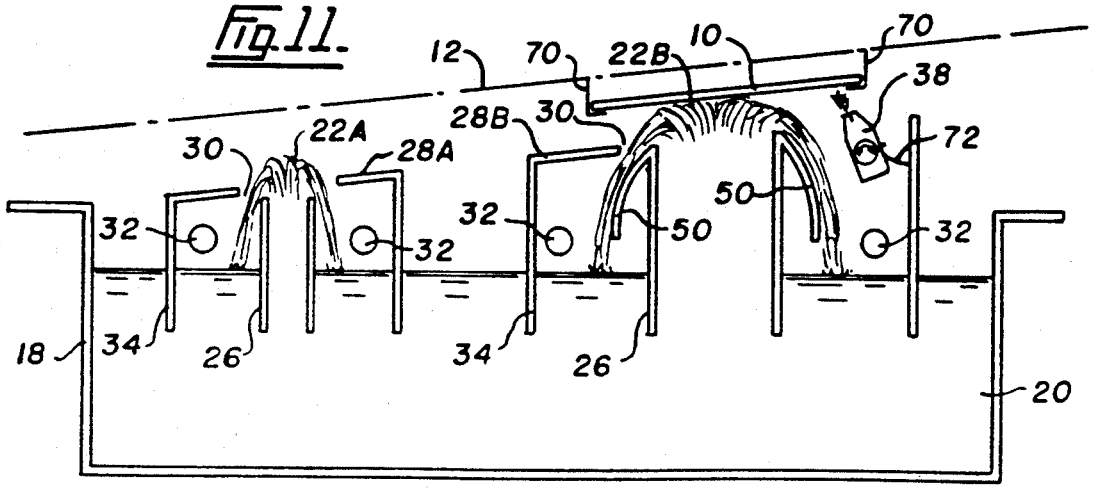

GAS SHROUDED WAVE SOLDERING WITH GAS KNIFE

The present application is a continuation-in-part of co-pending application Ser. No. 07/860,316 filed on Mar. 30, 1992, now U.S. Pat. No. 5,203,489, which in turn is a continuation-in-part of co-pending application Ser. No. 07/804,904 filed on Dec. 6, 1991, now abandoned.

TECHNICAL FIELD

The present invention relates to wave soldering of elements such as printed wiring boards and more specifically to solder coating of wettable metallized surfaces or solder joining at least two wettable metallized surfaces on wiring boards in a solder wave wherein the wave is blanketed with a reduced oxygen atmosphere when a board passes through the solder wave followed by a gas jet to remove excess solder.

BACKGROUND ART

Today printed wiring boards, circuit boards and other elements have smaller wettable surfaces to be solder coated and joined. In co-pending application Ser. No. 07/860,316 is disclosed gas shrouded wave soldering wherein a solder wave has a cover means with a slot for the solder wave to project therethrough and wherein an inert gas supply, preferably nitrogen, is provided underneath the cover so that solder coating of wettable surfaces occurs to circuit boards and the like when they are substantially blanketed by the inert gas.

In co-pending application Ser. No. 07/860,316 reference is made to soldering without the use of flux. Whereas flux may not be necessary in certain cases, there are situations where a fluxing step is advantageous depending upon the type of solder, the size and location of the wettable surfaces to be soldered and the speed or time which the solder is applied. Whereas dross in some instances may form on wettable surfaces after soldering, if one could remove dross and oxide particles from the solder, then some of the problems that have occurred in the past with utilizing flux are avoided. A fluxing step before a preheating step in air cleans the wettable metallized surfaces to be solder coated and joined.

In the aforesaid co-pending application soldering occurs under an inert gas atmosphere (the term inert is applied to gas which includes nitrogen) which prevents oxides forming on the liquid solder surfaces. U.S. Pat. No. 5,044,542 shows shield gas wave soldering wherein shield gas or reducing gas blankets the solder wave during the soldering step. The benefits of soldering in an atmosphere which has a reduced oxygen content are known.

Tardoskegyi in U.S. Pat. No. 3,705,457 and Elliott et al in U.S. Pat. application Ser. No. 549,603 both disclose the use of a gas knife jet. U.S. Pat. Nos. 4,402,448, 4,679,720 and 4,995,411 all assigned to Hollis Automation Inc. disclose the uses of gas or air knife jets for cleaning surface mounted conductor elements carried by printed circuit boards.

One of the problems with flux in the past is that the flux itself caused a deposit or residue on the solder coated surfaces after solder coating and this residue generally had to be removed by cleaning after soldering. However, flux technology has improved and it is now possible to use what is sometimes referred to as a "no-clean" flux which does not leave a residue and does not require solder coated surfaces to be cleaned after solder coating. The term "no-clean" flux is applied to a flux which leaves a low level of residue on solder, the residue generally being non-corrosive and non-conductive. One example of a no-clean flux contains little or no halide, another example is a non-corrosive and non-conductive organic acid dissolved in an ethanol or isopropanol solvent. A further example is common RMA flux which is a mixture of a rosin, such as abietic acid, an activator, such as divethylamine hydrochloride and solvent such as alcohol.

The addition of a small quantity of adipic acid with a solvent such as ethyl or isopropyl alcohol results in a no-clean flux. Furthermore, it is known that low dross solder, which contains from about 10 to 1000 ppm phosphorous, reduces dross formation in a solder pot exposed to air. By utilizing a low dross solder it has been found that the shield gas used to blanket a solder wave during solder coating does not require all oxygen to be removed from the atmosphere. A satisfactory solder coating can be obtained with low dross solder when an oxygen content of about 5% is included in the shield gas. In some situations oxygen contents greater than 5% are satisfactory. Thus the cost of a shield gas is greatly reduced, and this results in savings in the soldering process.

DISCLOSURE OF INVENTION

It is an aim of the present invention to provide a cover or shroud to at least partially cover a solder reservoir and blanket the solder wave and solder within the reservoir with a shield gas. At least one, and preferably two or more solder nozzles are used with each solder wave having its own independent wave height control and shield gas flow control. Several narrow solder waves are easier to blanket with shield gas rather than one single large solder wave. A gas knife which can be adjusted and may be heated may be incorporated into the shroud or located beyond the solder reservoir. The gas knife supplies hot air or hot gas, dependent upon the particular use to which it is to be put, to remove excess solder on elements that have been solder coated.

The present invention provides in one embodiment a process of wave soldering an element comprising the steps of; projecting a solder wave from a solder nozzle above a solder reservoir containing solder, through a slot in a cover means over the solder reservoir; providing shield gas underneath the cover means to pass through the slot on both sides of the solder wave and blanket the solder wave; passing the element in a predetermined path above the cover means so that at least a portion of the element passes through the solder wave while being blanketed by the shield gas, and projecting a linear jet of gas from a gas knife onto the element after the element passes through the solder wave to remove excess solder from the element.

In another embodiment there is provided a process for wave soldering an element comprising the steps of: projecting a solder wave from a solder nozzle above a solder reservoir containing low dross solder, through a slot in a cover means over the solder reservoir; providing a shield gas of nitrogen with oxygen in the range of 1 ppm to 50,000 ppm (5%), underneath the cover means to pass through the slot on both sides of the solder wave and blanket the solder wave, and passing the element in a predetermined path above the cover means so that at least a portion of the element passes through the solder wave while being blanketed by the shield gas.

In a still further embodiment there is provided an apparatus for wave soldering an element comprising: a solder reservoir adapted to contain molten solder, and having at least one solder wave nozzle projecting therefrom; pump means for forming a solder wave from the nozzle; cover means for covering at least a portion of the reservoir having at least one longitudinal slot for the solder wave to pass therethrough; supply means for supplying pressured gas to the underside of the cover means, the gas permitted to pass upwards through the slot on both sides of the solder wave and provide a gas blanket over the solder wave, conveyor means for moving the element in a predetermined path over the cover means ensuring at least a portion of the element passes through the solder wave, and gas knife means located to project a linear jet of gas onto the element after the solder wave to blow off excess solder.

In yet a further embodiment there is provided a cover for use with a solder reservoir having at least one solder wave nozzle and means for forming a solder wave from the nozzle, the cover comprising a shroud means to surround the nozzle having skirts to extend down below a level representing solder level in the solder reservoir, the shroud means having at least one slot to fit over the solder wave and provide longitudinal gaps on both sides of the solder wave; gas diffuser means below the shroud means on both sides of the slot, adapted to permit gas to pass upwards through the longitudinal gaps on both sides of the solder wave, and gas knife means positioned adjacent the solder wave nozzle outside the shroud means to project a linear jet of gas after the solder wave.

BRIEF DESCRIPTION OF DRAWINGS

In drawings which illustrate embodiments of the present invention,

FIG. 1 is a diagrammatical side view showing a conveyor for passing elements substantially horizontally over a fluxer, a preheater, through two shrouded solder waves and past a gas knife to clean excess solder off the elements.

FIG. 2 is a partial sectional view showing two shrouded solder waves above a solder reservoir with a gas knife positioned on one end of a shroud after the second solder wave, the conveyor is inclined upwards.

FIG. 4 is the diagrammatical side view of FIG. 1 with an enclosure over the solder reservoir only.

FIG. 5 is the diagrammatical side view of FIG. 1 with an enclosure extending over the fluxer, preheater and solder reservoir.

FIG. 6 is a partial sectional view showing a shrouded solder wave according to another embodiment of the present invention, the solder wave being streamline and having a substantial even flow on input and exit sides.

FIG. 7 is a partial sectional view showing two shrouded solder waves according to a further embodiment of the present invention.

FIG. 8 is a partial sectional view showing two shrouded solder waves according to a still further embodiment of the present invention.

FIG. 9 is a partial sectional view showing a shrouded solder wave with a gas knife according to yet another embodiment of the present invention.

FIG. 10 is a partial sectional view showing two solder waves similar to FIG. 8 and including covers positioned over each solder wave.

FIG. 11 is a partial sectional view showing two solder waves with a gas knife after the second wave and having a flexible seal flap between the gas knife and the shroud.

MODES FOR CARRYING OUT THE INVENTION

Figure 3:
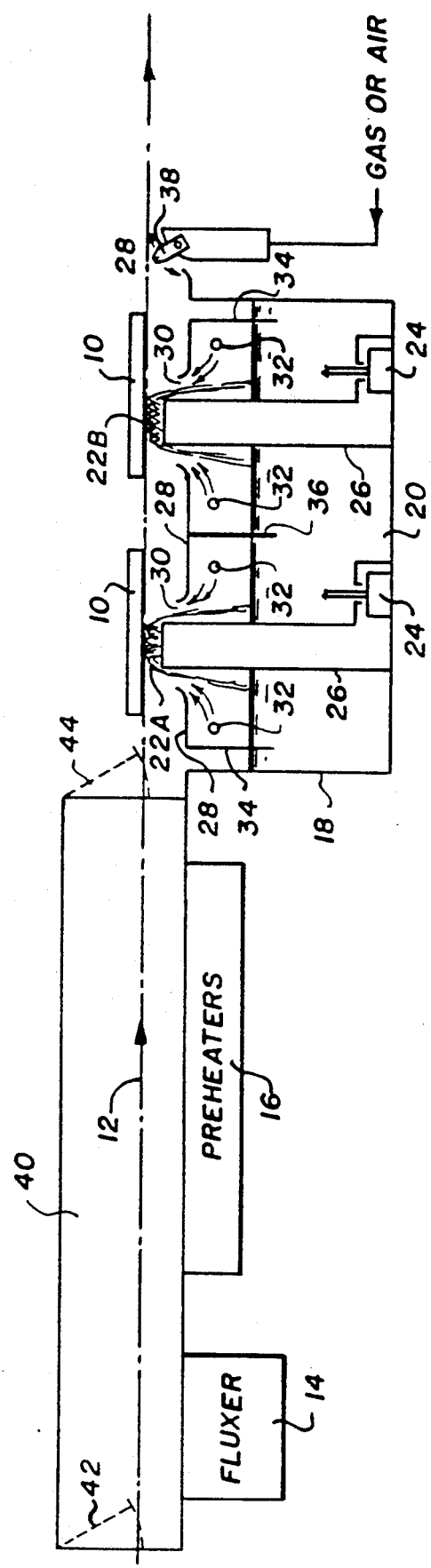
FIG. 3 is the diagrammatical side view of FIG. 1 with an enclosure over the fluxer and preheater.

Low dross solder contains a phosphorous concentration generally in the range of about 10 to 1000 ppm. One example of a low dross solder is sold by Alpha Metals under their tradename HI FLO Alloy 63/37. When this solder is used in an atmosphere with a reduced oxygen content, then it is found that solder bridging and excessive solder deposits on metallized surfaces no longer occurs, or at least is reduced. Furthermore, whereas in the past in order to attain reduction in solder dross, it was necessary to have a pure nitrogen atmosphere. This is no longer required and oxygen contents of up to 10,000 ppm (5%) are satisfactory for reduction in dross, furthermore bridging and excessive solder deposits are eliminated or at least reduced. When oxygen is reduced to 5% or less in a shield gas, dross formation is reduced even utilizing the low dross solder. Thus use of low dross solder eliminates the need to inert the solder waves with a high purity nitrogen or a more expensive inert gas such as argon. By using nitrogen or another inert gas with a higher oxygen content, one reduces the cost of the gas. Pure nitrogen is expensive whereas a lower purity of nitrogen is far cheaper. Nitrogen can be produced from air using membrane technology. Such a process retains some oxygen content but generally less than 10,000 ppm (5%) which is satisfactory for use with the present invention. The oxygen content of the shield gas, primarily nitrogen is preferably in the range of 1 to 50,000 ppm (5%) and in a specific preferred embodiment 10 to 1,000 ppm.

Elements, preferably circuit boards 10, are shown in FIG. 1 being conveyed substantially horizontally on a conveyor 12 through a fluxer 14 for applying a flux to the wettable metallized surfaces to be coated or joined. The flux may be a no-clean flux which is a flux that after solder coating leaves a low level of residue that is both non-corrosive and non-conductive. This avoids the necessity of having to clean the flux residues off the surfaces after soldering. In some cases other types of flux are used and a solvent cleaner may be applied to clean the flux off the solder coated surfaces after the soldering step. One type of no-clean flux includes adipic acid, up to 3% by weight. Other types of no-clean flux are readily available on the market today.

After the fluxing step, which is only necessary in certain types of soldering under reduced oxygen environments, the elements 10 on the conveyor 12 pass through a heating stage. Preheaters 16 heat the elements 10 up to the required temperature for soldering. In one embodiment the preheating and fluxing stage occur in air, however in other embodiments both the preheating and the fluxing stage either individually or together may occur within a shield gas environment with reduced oxygen to prevent oxidizing of surfaces to be soldered.

A solder reservoir 18 has solder 20 therein, the solder in one embodiment is a low dross solder, however, in other instances shield gases may permit the use of conventional solders without dross forming. Two solder waves 22A and 22B are shown, one after the other, both solder waves 22A and 22B illustrated are turbulent waves wherein solder 20 is pumped by an additional pump 24 up through a nozzle 26. The solder pumps 24 are adjustable to permit adjustment of the heights of the solder waves 22A and 22B.

Two turbulent solder waves shown in FIG. 1 are small waves from narrow nozzles and easy to control. The two pumps 24 can be varied to control the height of the solder waves 22A and 22B for different types of elements 10 to be soldered. The height of the elements 10 above the solder waves 22A and 22B can also be adjusted by positioning the elements 10 at a desired elevation on the conveyor 12.

Shrouds 28, similar to those disclosed in co-pending application Ser. No. 860,316, filed Mar. 30, 1992, entitled Gas Shrouded Wave Soldering, are provided over the solder reservoir 18 leaving slots 30 for the solder waves to exit. The slots 30 leave gaps between the edge of the slot 30 and the solder wave 22A or 22B and gas diffusers 32 are positioned on each side of the solder wave below the shroud 28 so that the space under the shroud and above the solder level in the reservoir 18 is completely blanketed with shield gas. The gaps provide a sufficient flow of shield gas to cover or blanket the side of the solder wave, and at the same time prevent air from entering the shroud. The size of the gaps are preferably not wider than necessary to keep the shield gas flow as low as possible, and still provide the necessary blanketing. There is an escape of gas through the slots 30 in the gaps on both sides of the solder waves 22A and 22B. The gas is shield gas and preferably has less than 5% oxygen. In a preferred embodiment gas is nitrogen and blankets solder in the solder reservoir 18 and also blankets both sides of the solder wave when an element 10 is passing through the wave.

The shroud 28 has skirts 34 on all sides extending down into the solder 20 in the solder reservoir 18. A divider skirt 36 in the center of the shroud 28 also extends down into the solder wave, thus providing two separate spaces, one for each solder wave. This permits the flow of gas into the two spaces to be controlled separately. In one case a higher pressure may be desired or greater flow may be desired in one of the spaces.

After the elements or boards 10 pass through the solder waves 22A and 22B, a gas knife 38, preferably of the type shown in U.S. Pat. Nos. 4,679,720 or 4,995,411, provides a linear jet of gas which is directed against the underside of the element 10 and blows off any excess solder. The gas knife may be heated or, alternatively, gas entering the gas knife may be heated. Furthermore the position of the gas knife 38 can be varied vertically and horizontally, the knife may be rotated so the gas projects at different angles. This permits adjustments to be made for different types and sizes of elements 10 and boards. The gas may be a shield gas with reduced oxygen or, alternatively, may be air.

FIG. 2 shows another embodiment wherein the conveyor 12 is sloped upwards. Different types of solder waves 22A and 22B are illustrated wherein a first solder wave 22A is a turbulent solder wave and the second one 22B is a non-turbulent smooth laminar flow solder wave of the type shown in U.S. Pat. No. 3,921,888.

One, two or more solder waves may be provided, the solder waves may be of all wave configurations including turbulent, streamline, hollow jet and combinations of different configurations. The list of configurations is in no way limiting.

The gas knife 38 is shown mounted on the shroud 28 after the second solder wave 22B, projecting upwards to ensure that a linear jet blows against the underside of the element as it passes. Solder blown off the element may be arranged to return to the solder reservoir.

The shroud 28 together with the gas knife 38 may form part of a retro package for installation on existing solder wave equipment. The shroud 28 is made to fit over the solder reservoir 18 and the elongated slots 30 are provided to fit the solder wave or solder waves. Whereas two solder waves are shown in the drawings, more than two solder waves may be used if required or, alternatively a single solder wave may also be used.

An enclosure 40 or tunnel is shown in FIG. 3 enclosing the conveyor 12 as elements or boards 10 are conveyed past the fluxer 14 and the preheaters 16. An entrance curtain 42 and an exit curtain 44 are provided to restrict gas from escaping from the enclosure 40. A shield gas environment may be maintained within the enclosure 40. FIG. 4 shows an enclosure 46, or hood positioned over the solder pot 18 only without a gas knife, and FIG. 5 shows an extended tunnel 48 extending over the conveyor 12 from the fluxer 14, the preheaters 16 and the solder reservoir 18. The enclosure 48 also extends over a gas knife 38 positioned directly after the solder reservoir 18.

A different solder nozzle arrangement 26 is shown in FIG. 6 with guides 50 on both sides of the nozzle. The solder wave has a smooth streamline flow falling back on both inlet and exit of the nozzle 26 and guided back into the solder reservoir by the guides 50. This type of solder wave is sometimes defined as a bi-directional solder wave.

Adjustable strips 52 are mounted on the shroud 28 adjacent the slots 30 to permit the gaps to be varied for different wave heights. Provision is also made in one embodiment to raise or lower either the conveyor or the solder pot so the height between the solder wave and the conveyor line 12 can be varied.

The diffusers 32 for shield gas supply, preferably nitrogen, may be replaced with drilled tubes. The shield gas supply can be turned off with the solder wave when no boards are present as the shield effect is almost instantaneous. Intermittent use of shield gas reduces gas consumption.

FIG. 7 shows a solder wave arrangement with a turbulent first solder wave 22A and a smooth streamline bi-directional second solder wave 22B similar to that shown in FIG. 6. The conveyor line 12 is shown sloped but in another embodiment may be substantially horizontal. A vibration blade 54 attached by a rod 56 to a vibrator 58 provides a vibration to the wave in accordance with U.S. Pat. No. 4,684,056 (Reissue U.S. Pat. No. Re. 33,197).

The bi-directional solder wave 22B has a smooth top solder surface. When an element or board 10 passes through the solder wave 22B the shield gas passes through the gaps on each side of the wave and shields or inerts the space between the solder wave 22B, the shroud 28 and the board 10.

The embodiment shown in FIG. 6 has the shroud 28 attached to the side of the solder reservoir 18 while in the embodiment shown in FIG. 7, the shroud has skirts 34 extending down into the solder to provide a seal and ensure the space under the shroud can be sealed to prevent entry of air into the shielded atmosphere.

In FIG. 8, an enclosure 48 is provided over the solder reservoir 18 which is sealed to the top edge of the solder reservoir 18. The enclosure 48 or tunnel contains shield gas that passes up through slots 30 from under the shrouds 28A and 28B. In the embodiment shown, a first shroud 28A surrounds the first solder wave 22A and a second shroud 22B surrounds the second solder wave 22B. The separate shrouds permit individual shield gas supply. The shroud top surfaces are flat to trap shield gas within.

FIG. 9 shows a bi-directional solder wave 22 with a gas knife 38 positioned on the exit side of the wave 22 under the shroud 28 to direct gas through the slot 30 to blanket the wave. When a board 10 is passing through the wave the gas knife diverts gas, either shield gas, or in certain cases air, to blanket the space where the board leaves the solder wave. This protects the board with the fresh solder surfaces thereon and the solder wave.

Whereas FIG. 8 shows an enclosure 48 over two solder waves, in FIG. 10 two separate top covers 60 are provided over the shrouds 28A and 28B and solder waves 22A and 22B, the top covers 60 not extending for the full lengths of the shrouds 28A and 28B. The top covers 60 help to trap shield gas passing up through the slots 30 and thus reduce oxide formation on the crest of the solder waves. The top of the top covers 60 are preferably glass for viewing the wave and the sides 62 are adjustable for height and are made from flexible material to act as curtains. The sides 62 may be pushed aside when circuit boards are conveyed on the conveyor path 12.

The conveyor path is shown inclined upwards but in another embodiment is substantially horizontal. The second solder wave 22B is a bi-directional wave, the nozzle 26 with the plates 50 is adjustable vertically to adjust wave height. Wave flow is adjustable by means of the solder pump (not shown). With a combination of varying wave height and wave flow, the inclination of the conveyor path 12 is also adjustable.

In the embodiment shown in FIG. 11, the circuit board 10 is supported on fingers 70 from the conveyor 12. A gas knife 38 is positioned on the exit side of the wave 22B and may be pivoted to adjust the direction of gas flow from the gas knife 38. A rubber seal flap 72 is connected to the side of the shroud 28B extending down to the skirt 34 in the solder reservoir. The seal flap is made of suitable material that is flexible, so the gas knife may be pivoted to a preferred location to selectively direct gas, and prevents gas exiting from under the shroud 28B downstream of the air knife 38.

Various changes may be made to the embodiments shown herein without departing from the scope of the present invention which is limited only by the following claims.

The embodiments of the present invention in which an exclusive property or privilege is claimed are defined as follows:

1. A process of wave soldering an element comprising the steps of:
   projecting at least one solder wave from a solder nozzle above a solder reservoir containing solder, through a slot in a cover means over the solder reservoir;
   providing shield gas underneath the cover means to pass through the slot on both sides of the solder wave and blanket the solder wave;
   passing the element in a predetermined path above the cover means so that at least a portion of the element passes through the solder wave while being blanketed by the shield gas, and
   projecting a linear jet of gas from a gas knife onto the element after the element passes through the solder wave to remove excess solder from the element.

2. The process of wave soldering according to claim 1 wherein two solder waves are projected from nozzles above a solder reservoir, and wherein the cover means contains separate areas around each solder wave for shield gas.

3. The process of wave soldering according to claim 1 including means for controlling the solder wave height.

4. The process of wave soldering according to claim 2 including gas delivery means positioned on each side of each solder wave to provide shield gas underneath the cover means, and wherein gas flow through the gas delivery means is controlled for each solder wave.

5. The process of wave soldering according to claim 4 wherein the gas delivery means comprises diffusers positioned on each side of each solder wave.

6. The process of wave soldering according to claim 1 wherein the gas knife is heated.

7. The process of wave soldering according to claim 1 wherein the gas knife is provided with heated air.

8. The process of wave soldering according to claim 1 wherein the gas knife is provided with heated shield gas.

9. The process of wave soldering according to claim 1 wherein the solder is a low dross solder containing in the range of 10 to 1000 ppm phosphorous.

10. The process of wave soldering according to claim 1 wherein the shield gas is nitrogen containing oxygen in the range of 1 ppm to 50,000 ppm (5%).

11. The process of wave soldering according to claim 1 wherein the shield gas is nitrogen containing oxygen in the range of about 10 to 1,000 ppm.

12. The process of wave soldering according to claim 1 including the steps of fluxing and preheating the element prior to passing through the solder wave.

13. The process of wave soldering according to claim 12 wherein the fluxing is a no-clean flux.

14. The process of wave soldering according to claim 1 wherein the predetermined path is substantially horizontal.

15. The process of wave soldering according to claim 1 wherein the predetermined path is inclined.

16. The process of wave soldering according to claim 12 including passing the element in an enclosure means during the fluxing and preheating steps.

17. The process of wave soldering according to claim 12 including passing the element in an enclosure means during fluxing, preheating and soldering.

18. The process of wave soldering according to claim 1 including an enclosure means over the solder reservoir only enclosing the solder wave and cover means, and having curtain means on the enclosure means for restricting escape of shield gas from the enclosure means.

19. The process of wave soldering according to claim 1 wherein the solder wave is a bi-directional non-turbulent flow solder wave.

20. The process of wave soldering according to claim 1 wherein the solder wave is a turbulent solder wave.

21. The process of wave soldering according to claim 19 wherein the solder wave is vibrated.

22. The process of wave soldering according to claim 1 including an upper cover means extending over a portion of the cover means above the predetermined path, the upper cover means trapping shield gas passing through the slot.

23. A process for wave soldering an element comprising the steps of:

projecting a solder wave from a solder nozzle above a solder reservoir containing low dross solder, through a slot in a cover means over the solder reservoir;

providing a shield gas of nitrogen with oxygen in the range of 1 ppm to 50,000 ppm (5%), underneath the cover means to pass through the slot on both sides of the solder wave and blanket the solder wave, and passing the element in a predetermined path above the cover means so that at least a portion of the element passes through the solder wave while being blanketed by the shield gas.

24. The process for wave soldering according to claim 23 wherein the low dross solder contains from about 10 to 1000 ppm phosphorous.

25. An apparatus for wave soldering an element comprising:

a solder reservoir adapted to contain molten solder, and having at least one solder wave nozzle projecting therefrom;

pump means for forming a solder wave from the nozzle;

cover means for covering at least a portion of the reservoir having at least one longitudinal slot for the solder wave to pass therethrough;

supply means for supplying pressurized gas to the underside of the cover means, the gas permitted to pass upwards through the slot on both sides of the solder wave and provide a gas blanket over the solder wave;

conveyor means for moving the element in a predetermined path over the cover means ensuring at least a portion of the element passes through the solder wave, and gas knife means located to project a linear jet of gas onto the element after the solder wave to blow off excess solder.

26. The apparatus for wave soldering according to claim 25 including at least two solder wave nozzles projecting from the solder reservoir, and solder waves from the two solder wave nozzles each passing through a longitudinal slot in the cover means.

27. The apparatus for wave soldering according to claim 26 wherein each of the nozzles has separate pump means.

28. The apparatus for wave soldering according to claim 27 including separate means to control solder wave height for each pump means.

29. The apparatus for wave soldering according to claim 26 wherein the cover means comprises a cover plate extending over the reservoir and having skirts at edges of the cover plate to extend down below a level representing a solder level in the solder reservoir.

30. The apparatus for wave soldering according to claim 26 wherein the supply means for supplying pressurized gas includes gas delivery means extending on both sides of the solder wave beneath the longitudinal slot in the cover means.

31. The apparatus for wave soldering according to claim 30 wherein the gas delivery means comprises gas diffusers.

32. The apparatus for wave soldering according to claim 26 including a divider extending down into the solder reservoir between the solder waves to provide two separate spaces under the cover means, and the supply means for supplying pressurized gas includes gas diffusers in each of the spaces under the cover means, the gas diffusers extending on both sides of each solder wave.

33. The apparatus for wave soldering according to claim 25 wherein the conveyor means moves the element in a substantially horizontal path.

34. The apparatus for wave soldering according to claim 25 wherein the conveyor means moves the element in an upward inclined path.

35. The apparatus for wave soldering according to claim 25 including a fluxer means located before the solder reservoir wherein the conveyor means moves the element through the fluxer means prior to passing through the solder wave.

36. The apparatus for wave soldering according to claim 35 including a preheater means to preheat elements prior to soldering and after the fluxer means.

37. The apparatus for wave soldering according to claim 25 wherein the gas knife means is a gas knife attached to the cover means.

38. The apparatus for wave soldering according to claim 25 wherein the gas knife means is separate from the cover means.

39. The apparatus for wave soldering according to claim 25 wherein the gas knife means has swivel means for varying the position and angle of the linear jet directed onto the element.

40. The apparatus for wave soldering according to claim 39 including flexible seal flap between the gas knife means and the cover means to seal the gas knife means to the cover means at any position and angle of the linear jet directed onto the element.

41. The apparatus for wave soldering according to claim 36 including an enclosure means over the preheater means and the fluxer means, the conveyor means passing through the enclosure means.

42. The apparatus for wave soldering according to claim 41 wherein the enclosure means extends over the solder reservoir.

43. The apparatus for wave soldering according to claim 25 wherein an enclosure means extends only over the solder reservoir, the conveyor means passing through an entry into the enclosure means, and an exit out of the enclosure means.

44. The apparatus for wave soldering according to claim 25 wherein the solder wave nozzle is adjustable for height relative to the predetermined path for the conveyor means.

45. The apparatus for wave soldering according to claim 25 wherein the solder wave nozzle produces a bi-directional non-turbulent solder wave.

46. The apparatus for wave soldering according to claim 25 wherein the solder wave nozzle produces a turbulent solder wave.

47. The apparatus for wave soldering according to claim 45 including vibratory means in the solder wave nozzle to vibrate the solder wave.

48. The apparatus for wave soldering according to claim 25 including an upper cover means extending over a portion of the cover means above the predetermined path, the upper cover means trapping gas permitted to pass upwards through the slot on both sides of the solder wave.

49. A cover for use with a solder reservoir having at least one solder wave nozzle and means for forming a solder wave from the nozzle, the cover comprising: a shroud means to surround the nozzle, the shroud means having at least one slot to fit over the solder wave and provide longitudinal gaps on both sides of the solder wave;

gas diffuser means below the shroud means on both sides of the slot, adapted to permit gas to pass upwards through the longitudinal gaps on both sides of the solder wave, and gas knife positioned adjacent the solder wave nozzle outside the shroud means to project a linear jet of gas after the solder wave.

50. The cover according to claim 49 wherein the shroud means has skirts which extend down below a level representing a solder level in the solder reservoir.

51. A process of wave soldering an element comprising the steps of:

projecting at least one solder wave from a solder nozzle above a solder reservoir containing solder, through a slot in a cover means over at least a portion of the solder reservoir;

providing gas delivery means positioned on each side of the solder wave underneath the cover means to pass shield gas through the slot on both sides of the solder wave and blanket the solder wave, and passing the element in a predetermined path above the cover means so that at least a portion of the element passes through the solder wave while being blanketed by the shield gas.

52. The process of wave soldering according to claim 51 wherein the solder wave is a bidirectional nonturbulent flow solder wave.

53. An apparatus for wave soldering an element comprising:

a solder reservoir adapted to contain molten solder, and having at least one solder wave nozzle projecting therefrom;

pump means for forming a solder wave from the nozzle;

cover means for covering at least a portion of the reservoir having at least one longitudinal slot for the solder wave to pass therethrough;

gas delivery means for supplying gas, positioned on each side of the solder wave underneath the cover means, the gas passing upwards through the slot on both sides of the solder wave to provide a gas blanket over the solder wave, and conveyor means for moving the element in a predetermined path over the cover means ensuring at least a portion of the element passes through the solder wave.

54. The apparatus for wave soldering according to claim 53 wherein the solder wave nozzle produces a bidirectional non-turbulent solder wave.

55. An apparatus for wave soldering an element comprising:

a solder reservoir adapted to contain solder and having at least one solder wave nozzle projecting therefrom to produce a bidirectional non-turbulent solder wave;

pump means for forming the bidirectional nonturbulent solder wave from the nozzle;

cover means for covering at least a portion of the reservoir having at least one longitudinal slot for the solder wave to pass therethrough, the cover means at an elevation above the nozzle;

gas delivery means for supplying pressurized gas to the underside of the cover means, the gas permitted to pass upwards through the slot on both sides of the solder wave and provide a gas blanket over the solder wave; and conveyor means for moving the element in a predetermined path over the cover means ensuring at least a portion of the element passes through the solder wave.

56. The apparatus for wave soldering according to claim 55 including a second solder wave nozzle projecting from the solder reservoir, the two solder waves each passing through separate longitudinal slots in the cover means.

57. An apparatus for wave soldering an element comprising:

a solder reservoir, adopted to contain solder and having at least one solder wave nozzle projecting therefrom;

pump means for forming a solder wave from the nozzle;

cover means for covering at least a portion of the reservoir having at least one longitudinal slot for the solder wave to pass therethrough;

at least one damper plate on the cover means located on each side of the longitudinal slot, the damper plate being movable to vary the width of the longitudinal slot;

gas delivery means for supplying pressurized gas to the underside of the cover means, the gas permitted to pass upwards through the slot on both sides of the solder wave and provide a gas blanket over the solder wave, and conveyor means for moving the element in a predetermined path over the cover means ensuring at least a portion of the element passes through the solder wave.

* * * * *

Disclaimer 5,240,169—John H. Gileta, Chateauguany, Canada. GAS SHROUDED WAVE SOLDERING WITH GAS KNIFE. Patent dated August 31, 1993. Disclaimer filed November 21, 2000, by the assignee, Electrovert Ltd.
The term of patent shall not extend beyond the expiration date of Pat. No. 5,203,489.
*(Official Gazette, March 6, 2001)*